(12) United States Patent
Kaizo et al.

(10) Patent No.: US 9,472,969 B2
(45) Date of Patent: Oct. 18, 2016

(54) ADAPTER AND ELECTRIC POWER TOOL

(71) Applicant: Panasonic Corporation, Osaka (JP)

(72) Inventors: Hiroyuki Kaizo, Kyoto (JP); Tadashi Arimura, Kyoto (JP); Toshiharu Ohashi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 379 days.

(21) Appl. No.: 13/962,356

(22) Filed: Aug. 8, 2013

(65) Prior Publication Data

US 2014/0042981 A1    Feb. 13, 2014

(30) Foreign Application Priority Data

Aug. 9, 2012    (JP) ................................. 2012-176930

(51) Int. Cl.
*H02J 7/00*    (2006.01)
*H02M 3/156*    (2006.01)

(52) U.S. Cl.
CPC .............. *H02J 7/007* (2013.01); *H02J 7/0065* (2013.01); *H02J 2007/004* (2013.01); *H02J 2007/0039* (2013.01); *H02M 3/156* (2013.01)

(58) Field of Classification Search
CPC .. H02J 7/007; H02J 7/0065; H02J 2007/004; H02J 2007/0039; H02M 3/156; H01M 2/1033
See application file for complete search history.

(56) References Cited

U.S. PATENT DOCUMENTS

| | | | |
|---|---|---|---|
| 6,075,346 A | 6/2000 | Kikuchi et al. | |
| 8,237,404 B2 | 8/2012 | Takano et al. | |
| 2001/0028571 A1* | 10/2001 | Hanada | H02H 9/001 363/50 |
| 2009/0108806 A1* | 4/2009 | Takano | B25F 5/02 320/112 |
| 2010/0213897 A1 | 8/2010 | Tse | |
| 2012/0262035 A1 | 10/2012 | Takano et al. | |

(Continued)

FOREIGN PATENT DOCUMENTS

| | | |
|---|---|---|
| CN | 101154820 | 4/2008 |
| JP | 2002-112465 | 4/2002 |

(Continued)

OTHER PUBLICATIONS

Chinese Office Action dated Apr. 3, 2015, including Search Report, issued in corresponding Chinese Patent Application No. 201310347179.3 and English translation thereof.

(Continued)

*Primary Examiner* — Nha Nguyen
(74) *Attorney, Agent, or Firm* — Renner, Otto, Boisselle & Sklar, LLP

(57) ABSTRACT

An adapter includes a converter unit which increases at least one of voltage and current outputted from a battery pack and supply the increased the voltage and/or the current to a load, and a characteristic detection unit which detects at least one of the voltage outputted from the battery pack, the current outputted from the battery pack, a temperature of the battery pack, a voltage inputted to the load, a current inputted to the load and a temperature of the converter unit. The adapter further includes a control unit configured to control the converter unit to increase each of said at least one of the voltage and the current outputted from the battery pack to a corresponding reference value and perform a control operation of suppressing such increase to prevent an occurrence of over-current or over-discharge based on at least one detection result.

18 Claims, 15 Drawing Sheets

(56) References Cited

U.S. PATENT DOCUMENTS

| | | | |
|---|---|---|---|
| 2013/0038289 A1 | 2/2013 | Tse | |
| 2013/0154584 A1 | 6/2013 | Sakaue et al. | |

FOREIGN PATENT DOCUMENTS

| | | | |
|---|---|---|---|
| JP | 2003-219510 | | 7/2003 |
| JP | 2008-178278 | | 7/2008 |
| JP | 2011-20187 | | 2/2011 |
| JP | 2011-161545 | | 8/2011 |
| JP | 2011-205866 | | 10/2011 |
| JP | 2012-035349 | | 2/2012 |
| WO | 2011/103469 | | 8/2011 |
| WO | WO2012/096199 | * | 1/2012 |
| WO | 2012/056672 A2 | | 5/2012 |

OTHER PUBLICATIONS

Chinese Office Action dated Dec. 3, 2015, including search report, issued in corresponding Chinese Patent Application No. 201310347179.3 and English translation thereof.

Japanese Office Action dated Jan. 19, 2016 issued in corresponding Japanese Patent Application No. 2012-176930 and English summary thereof.

Chinese Office Action dated Jun. 2, 2016 issued in corresponding Chinese Patent Application No. 201310347179.3 and English translation thereof.

Extended European Search Report dated Jul. 1, 2016 issued in corresponding European Patent Application No. 13179822.5.

* cited by examiner

ADAPTER AND ELECTRIC POWER TOOL

FIELD OF THE INVENTION

The present invention relates to an adapter and an electric power tool.

BACKGROUND OF THE INVENTION

Conventionally, there is known an electric power tool in which an adapter capable of mounting a battery pack having a different rated voltage is provided between a tool body and the battery pack. In an electric power tool described in, e.g., Japanese Patent Application Publication No. 2012-35349, an adapter is provided with a converter circuit. Even when a battery pack having a different rated voltage is used, the electric power supplied to the tool body is adjusted by controlling the electric power (voltage) supplied from the battery pack (power source), that is by performing a step-up or step-down operation with the converter circuit.

In the electric power tool which employs the adapter provided with the converter circuit, there is a need to increase (step up) the battery pack voltage so as to become a rated voltage. When the step-up operation is continuously performed in a state that a work load remains high, there may occur over-current. Possibly, the battery pack may be heated and may be out of order. In view of this, when the over-current or over-discharge is likely to occur, it is considered to cut off the electric power supplied to a load (a motor in case of the electric power tool), thereby stopping the operation of the load. However, such stoppage of the operation of the load may worsen the workability of a user who makes use of the electric power tool.

This holds true in an electric power tool in which a converter circuit as a component of an adapter is provided in a tool body, i.e., an electric power tool having a built-in adapter.

SUMMARY OF THE INVENTION

In view of the above, the present invention provides an adapter and an electric power tool capable of suppressing an occurrence of over-current or over-discharge while maintaining workability.

In accordance with an embodiment of the present invention, there is provided an adapter including: a converter unit configured to increase at least one of a voltage and a current outputted from a battery pack and supply the increased at least one of the voltage and the current to a load; a characteristic detection unit configured to detect at least one of the voltage outputted from the battery pack, the current outputted from the battery pack, a temperature of the battery pack, a voltage inputted to the load, a current inputted to the load and a temperature of the converter unit; and a control unit configured to control the converter unit to increase each of said at least one of the voltage and the current outputted from the battery pack to a corresponding reference value and further perform a control operation of suppressing the increase of said at least one of the voltage and the current in the converter unit to prevent an occurrence of over-current or over-discharge based on at least one detection result detected by the characteristic detection unit.

Further, the control unit may perform the control operation of suppressing the increase of said at least one of the voltage and the current in the converter unit within a range equal to or smaller than the corresponding reference value to prevent the occurrence of over-current or over-discharge based on said at least one detection result.

Further, the characteristic detection unit may be configured to detect the voltage inputted to the load, and the control unit may perform the control operation of suppressing the increase of said at least one of the voltage and the current in the converter unit to prevent the occurrence of over-current or over-discharge based on the detected voltage.

Further, the characteristic detection unit may be configured to detect the voltage outputted from the battery pack, and the control unit may perform the control operation of suppressing the increase of said at least one of the voltage and the current in the converter unit to prevent the occurrence of over-current or over-discharge based on the detected voltage.

Further, the characteristic detection unit may be configured to detect one of the current inputted to the load and the current outputted from the battery pack, and the control unit may perform the control operation of suppressing the increase of said at least one of the voltage and the current in the converter unit to prevent the occurrence of over-current or over-discharge based on the detected current.

Further, the characteristic detection unit may be configured to detect one of the temperature of the battery pack and the temperature of the converter unit, and the control unit may perform the control operation of suppressing the increase of said at least one of the voltage and the current in the converter unit to prevent the occurrence of over-current or over-discharge based on the detected temperature.

Further, the characteristic detection unit may be configured to detect at least two of the voltage outputted from the batter pack, the current outputted from the battery pack, the temperature of the battery pack, the voltage inputted to the load, the current inputted to the load and the temperature of the converter unit, and the control unit may perform the control operation of suppressing the increase of said at least one of the voltage and the current in the converter unit to prevent the occurrence of over-current or over-discharge based on at least two detection results detected by the characteristic detection unit.

Further, the characteristic detection unit is configured to detect one of the current outputted from the battery pack and the current inputted to the load, and one of the voltage outputted from the battery pack and the voltage inputted to the load, and when the detected current reaches a reference current value and the detected voltage becomes equal to or smaller than a reference voltage value, the control unit may stop the converter unit and allow the voltage supplied from the battery pack to be supplied to the load.

Further, the adapter described above may further include a storage unit in which temperatures of the battery pack and reference currents corresponding to the temperatures of the battery pack are stored. The characteristic detection unit may be configured to detect the temperature of the battery pack and the current outputted from the battery pack, and by referring to a reference current corresponding to the detected temperature of the battery pack, the control unit may compare the detected current with the reference current, and perform the control operation of suppressing the increase of said at least one of the voltage and the current in the converter unit when the detected current is higher than the reference current.

Further, the control unit may have a first over-current threshold and a second over-current threshold larger than the first over-current threshold. When a detection result reaches the first over-current threshold, the control unit may perform the control operation of suppressing the increase of said at least one of the voltage and the current in the converter unit to prevent the occurrence of over-current, and when the detection result reaches the second over-current threshold, the control unit may stop the operation of the load.

Further, the control unit may have a first over-discharge threshold and a second over-discharge threshold smaller than the first over-discharge threshold. When a detection result reaches the first over-discharge threshold, the control unit may perform the control operation of suppressing the increase of said at least one of the voltage and the current in the converter unit to prevent the occurrence of over-discharge, and when the detection result reaches the second over-discharge threshold, the control unit may stop the operation of the load.

In accordance with another embodiment of the present invention, there is provided an electric power tool including: the adapter described in any one of claims 1 to 11; the battery pack; and a tool body having the load.

Further, the adapter may be configured to be provided in the tool body.

Further, the adapter may be configured to be provided between the tool body and the battery pack.

In accordance with the present invention, it is possible for the adapter and the electric power tool to suppress the occurrence of over-current or over-discharge while maintaining workability.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

The present invention will now be described with reference to embodiments shown in the accompanying drawings which form a part hereof.

Hereinafter, an electric power tool provided with an adapter in accordance with an embodiment of the present invention will now be described with reference to the accompanying drawings, which form a part hereof.

Figure 1:
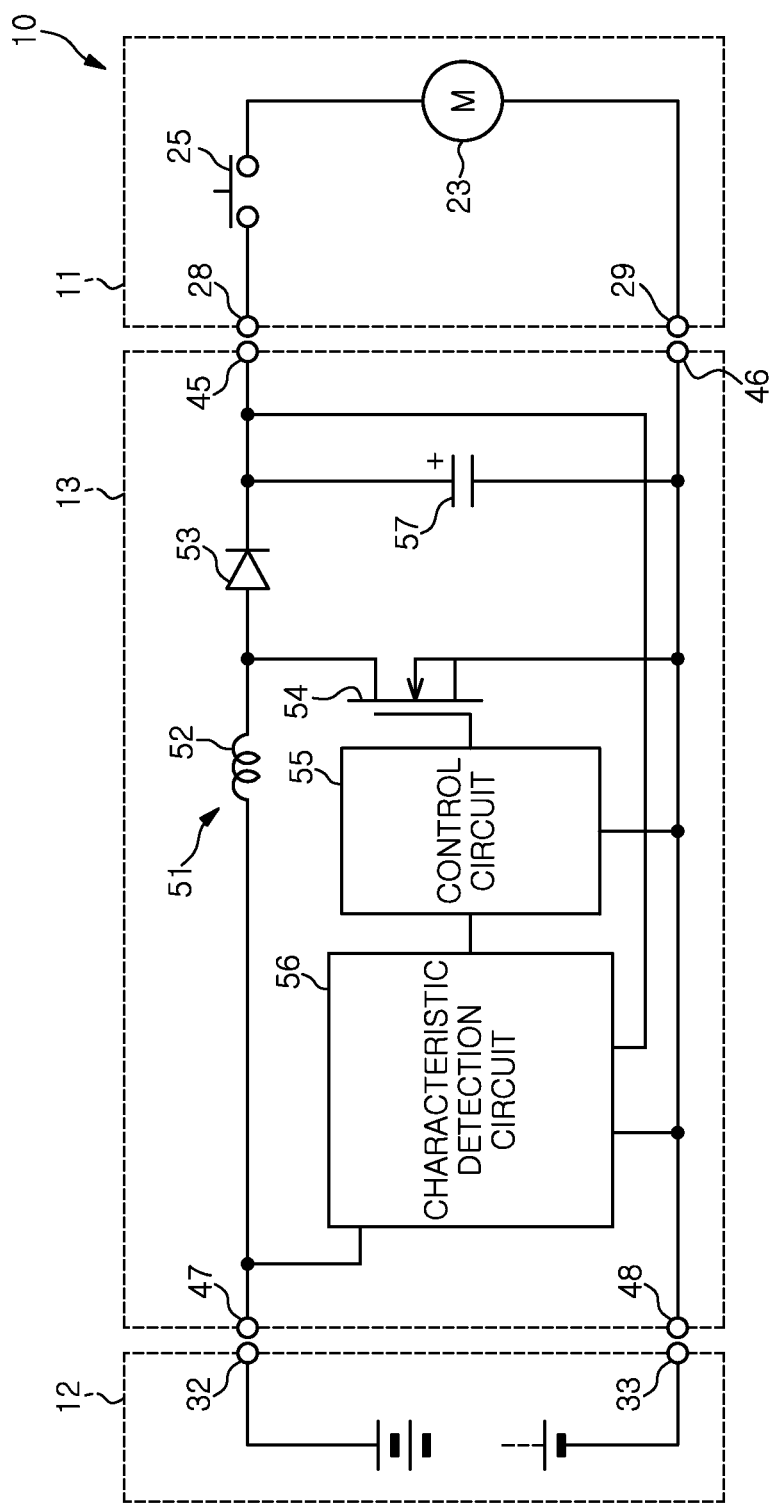
FIG. 1 is a circuit diagram for explaining a schematic configuration of an electric power tool in accordance with an embodiment.
Figure 3:
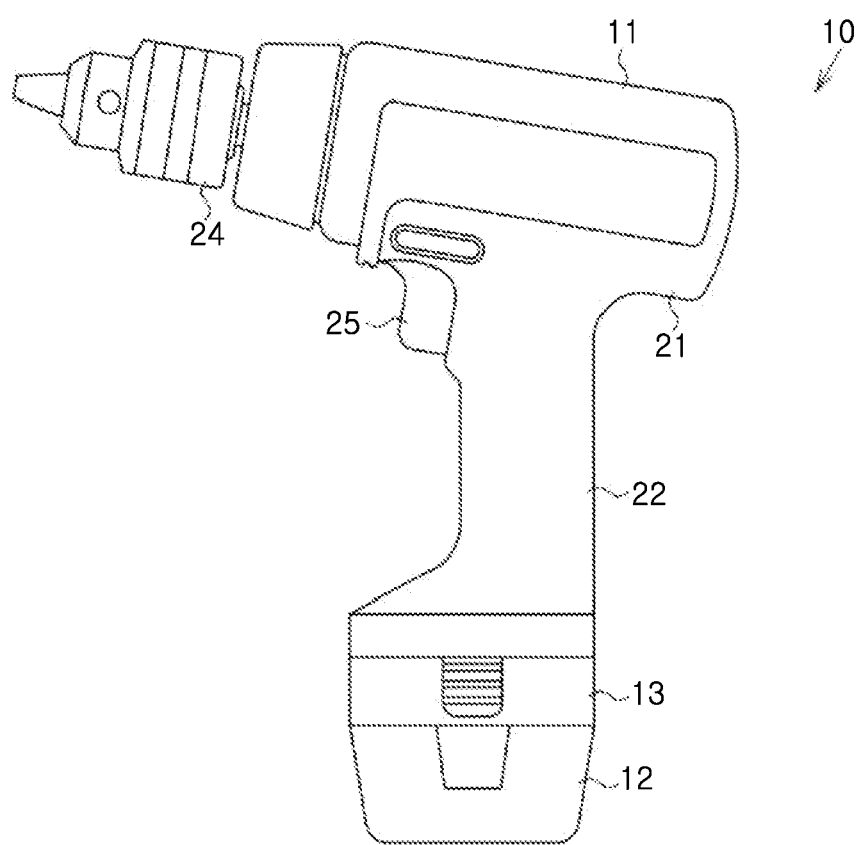
FIG. 3 shows the schematic configuration of the electric power tool in accordance with the embodiment.

As shown in FIGS. 1 and 3, the electric power tool 10 of the present embodiment includes a tool body 11, a battery pack 12 and an adapter 13 arranged between the tool body 11 and the battery pack 12.

Figure 4:
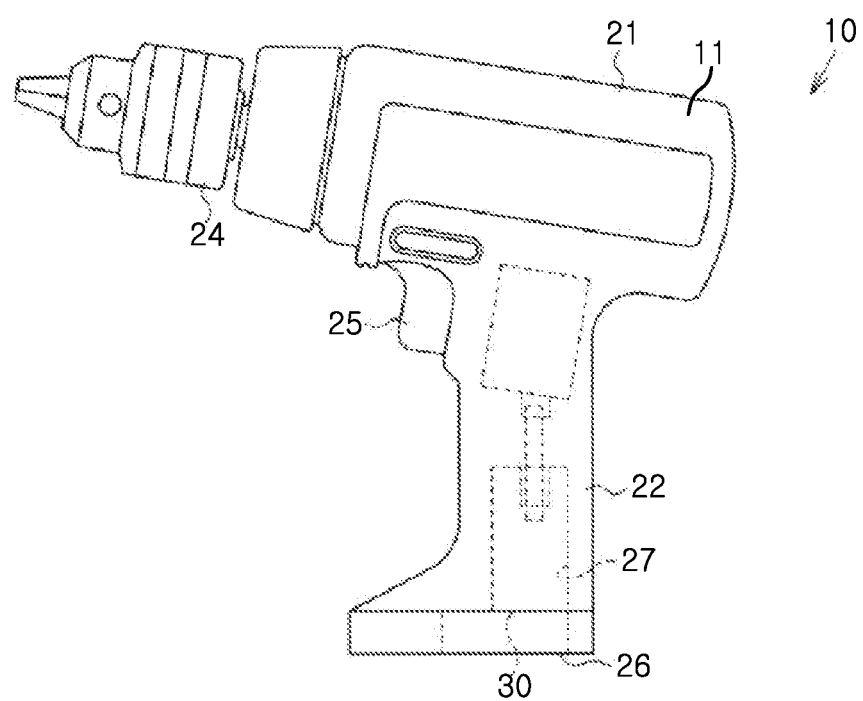
FIG. 4 shows the schematic configuration of a tool body making up the electric power tool in accordance with the embodiment.

Referring to FIG. 4, the tool body 11 includes a substantially tubular housing 21 and a handle 22 extending laterally (downwardly) from the housing 21. As illustrated in FIGS. 1 and 4, a motor 23 serving as a load is accommodated in the housing 21 of the tool body 11. The motor 23 is connected to a reduction gear mechanism (not shown) formed of a plurality of gear trains. The drive power of the motor 23 is transmitted to an output unit 24 of the tool body 11 via the reduction gear mechanism. The output unit 24 is rotatably arranged at the tip end of the housing 21. A front end tool (e.g., a driver bit or the like) is detachably attached to the tip end of the output unit 24.

As illustrated in FIGS. 1 and 4, the handle 22 is provided with a trigger switch 25, which is configured to instruct the operation and stop of the electric power tool 10. The trigger switch 25 is configured to control the rotation speed of the motor 23 by controlling the supply of electric power to the motor 23 according to adjustment of the push-in amount of the trigger switch 25.

The tool body 11 is provided with a mounting portion 26 for mounting the adapter 13 or the battery pack 12 at a lower end of the handle 22. One of the adapter 13 and the battery pack 12 is selectively mounted to the mounting portion 26. In the present embodiment, the mounting portion 26 is a so-called a plug-in type mounting portion 26 which includes a recess portion 27 formed on the lower end surface of the handle 22 and terminals arranged on the inner-side surface of the recess portion 27.

As shown in FIG. 1, the terminals of the mounting portion 26 include a first tool-side terminal 28 connected to a positive electrode of the battery pack 12 and a second tool-side terminal 29 connected to a negative electrode of the battery pack 12. The mounting portion 26 further includes a pair of engaged portions 30, which is configured to be engaged with a pair of engagement portions 49 of the adapter 13 or a pair of engagement portions 34 of the battery pack 12.

With such configuration, when a plug-in protrusion portion 44 of the adapter 13 or a plug-in protrusion portion of the battery pack 12 is inserted to a specified position, the engaged portions 30 prevent removal of the adapter 13 or the battery pack 12. Upon inserting the adapter 13 or the battery pack 12 to the specified position, the engaged portions 30 of the mounting portion 26 is engaged with the engagement portions 49 or the engagement portions 34, so that the first tool-side terminal 28 and the second tool-side terminal 29 of the mounting portion 26 come into contact with, and are electrically connected to, terminals 45 and 46 of the adapter 13 or the terminals 32 and 33 of the battery pack 12.

Figure 6:
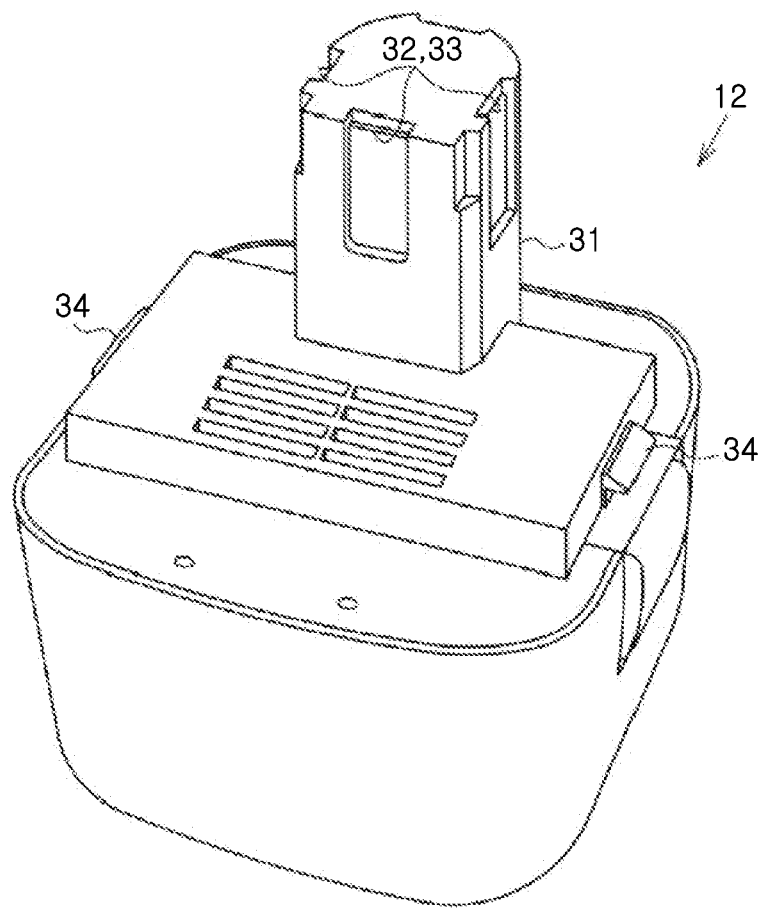
FIG. 6 is a perspective view of a battery pack making up the electric power tool in accordance with the embodiment.

As shown in FIG. 6, the battery pack 12 includes the plug-in protrusion portion 31 protruding upward. The plug-in protrusion portion 31 has the terminals 32 and 33 at its tip end. As depicted in FIG. 1, the terminals 32 and 33 are composed of a first power-source side terminal 32 on the positive electrode side and a second power-source side terminal 33 on the negative electrode side. The battery pack 12 includes a built-in rechargeable battery, and an example of the rechargeable battery includes a secondary battery such as a lithium-ion battery or the like. In the present embodiment, there are provided different types of battery packs 12, and voltages thereof are different from each other.

All the battery packs 12 of the present embodiment have the plug-in protrusion portion 31 of identical shape. Thus, the battery packs 12 are mounted in the same manner. The battery packs 12 are not limited to the plug-in type. As an alternative example, the battery packs 12 may be configured to be detachably attached to the lower surface of the handle 22 of the tool body 11 by sliding the battery packs 12 in the direction substantially orthogonal to the extension direction of the handle 22.

The adapter 13 is configured to be detachably mounted between the tool body 11 and the battery pack 12. The adapter 13 is configured to convert the voltage of the battery pack 12 to the rated voltage of the tool body 11.

Figure 5:
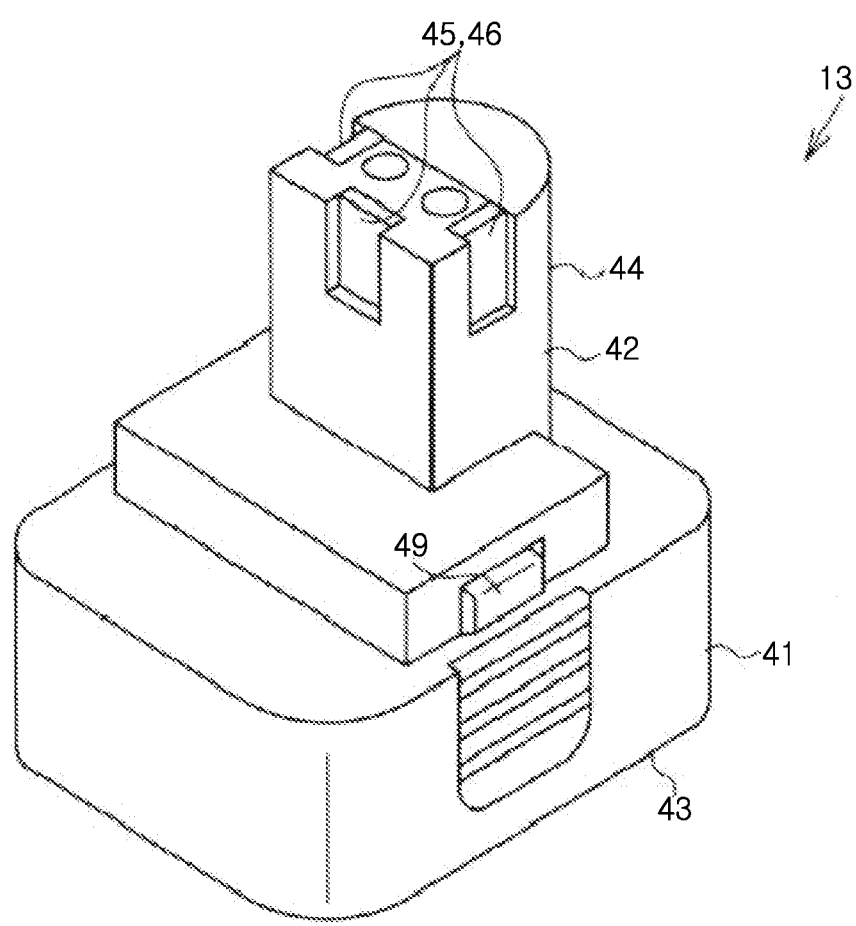
FIG. 5 is a perspective view of an adapter making up the electric power tool in accordance with the embodiment.

As shown in FIG. 5, the adapter 13 includes an adapter body 41, a tool connection portion 42 to be connected to the tool body 11 and a battery connection portion 43 to be connected to the battery pack 12.

The tool connection portion 42 is composed of a plug-in protrusion portion 44 protruding from one end surface (an upper surface) of the adapter body 41. The plug-in protrusion portion 44 is fitted into the recess portion 27 of the handle 22 of the tool body 11. The plug-in protrusion portion 44 has, at its tip end, output-side terminals 45 and 46, which are electrically connected to the terminals of the tool body 11. The output-side terminals 45 and 46 include a first output-side terminal 45 to be connected to the first tool-side terminal 28 and a second output-side terminal 46 to be connected to the second tool-side terminal 29.

The battery connection portion 43 is arranged on the other end surface (a lower surface) of the adapter body 41. The battery connection portion 43 is composed of a plug-in recess portion (not shown) into which the plug-in protrusion portion 31 of the battery pack 12 can be inserted. The plug-in recess portion has, on its inner-side surface, input-side terminals 47 and 48, which are electrically connected to the terminals of the battery pack 12. The input-side terminals 47 and 48 include a first input-side terminal 47 to be connected to the first power-source side terminal 32 and a second input-side terminal 48 to be connected to the second power-source side terminal 33.

The adapter 13 includes a converter circuit 51 configured to increase (step-up) the voltage of the battery pack 12 to convert the voltage of the battery pack 12 into the rated voltage of the tool body 11.

As shown in FIG. 1, the converter circuit 51 includes a coil 52 and a diode 53 serially connected between the first input-side terminal 47 and the first output-side terminal 45. The converter circuit 51 further includes a switching element (FET) 54 connected between the coil 52 and the second input-side terminal 48. A control circuit 55 is connected to the gate of the switching element 54. The ON/OFF operation of the switching element 54 is controlled by the control circuit 55. Connected to the output side of the adapter 13 is a characteristic detection circuit 56, which is configured to detect at least one of a voltage outputted from the battery pack 12, a current outputted from the battery pack 12, a temperature of the battery pack 12, a voltage inputted to the load (motor) 23, a current inputted to the load 23 and a temperature of the converter circuit (the converter unit) 51. Based on a detection value detected by the characteristic detection circuit 56, the control circuit 55 controls the ON/OFF operation and the duty ratio of the switching element 54. The converter circuit 51 further includes a smoothing capacitor 57 connected to the output side of the adapter 13.

Figure 2:
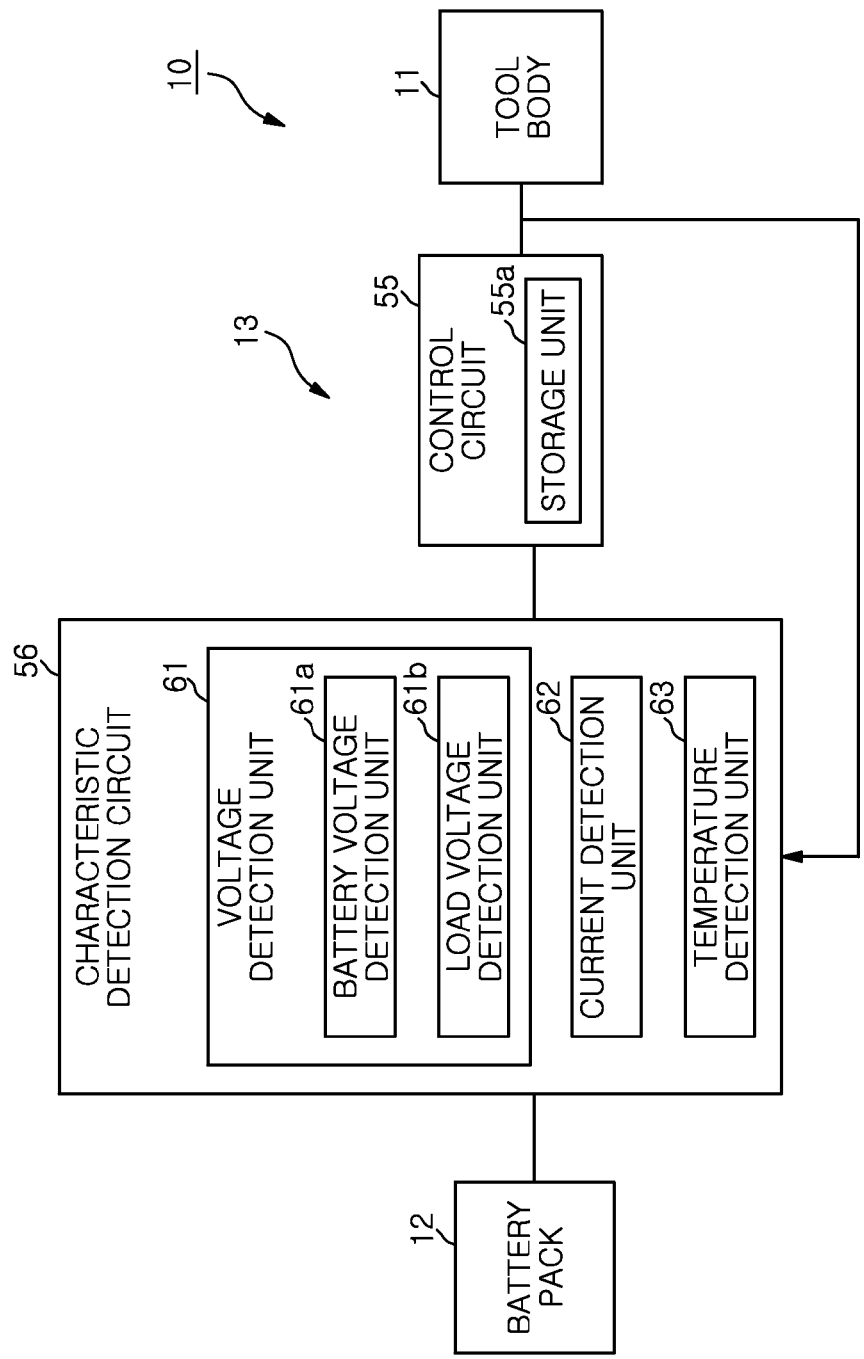
FIG. 2 is a block diagram for explaining the schematic configuration of the electric power tool in accordance with the embodiment.

As shown in FIG. 2, the characteristic detection circuit 56 may include a voltage detection unit 61 and a current detection unit 62. The voltage detection unit 61 may include a battery voltage detection unit 61a configured to detect a voltage Vin between the first input-side terminal 47 and the second input-side terminal 48 as a voltage of the battery pack 12, and a load voltage detection unit 61b configured to detect a voltage Vout between the first output-side terminal 45 and the second output-side terminal 46 as a load voltage. The current detection unit 62 detects a current Iin flowing between the first input-side terminal 47 and the coil 52 as a current outputted from the battery pack 12 and detects an output current Iout flowing between the diode 53 and the first output-side terminal 45 as a current outputted to the load (motor) 23.

As shown in FIGS. 1 and 2, the control circuit 55 controls the ON/OFF operation and the duty ratio of the switching element 54 such that detection results (here, detection voltage and current) have values corresponding to the specified voltage and current of the tool body 11. The control circuit 55 controls the switching element 54 so as to repeat the ON/OFF operation, thereby storing electromagnetic energy in the coil 52. At a moment when a specified amount of energy is stored in the coil 52, the control circuit 55 controls the switching element 54 such that the switching element 54 is turned off. As a result, the electromagnetic energy stored in the coil 52 is discharged, and the output voltage of the adapter 13 is thereby increased. The voltage thus increased is applied to the tool body 11 (the motor 23).

Figure 7:
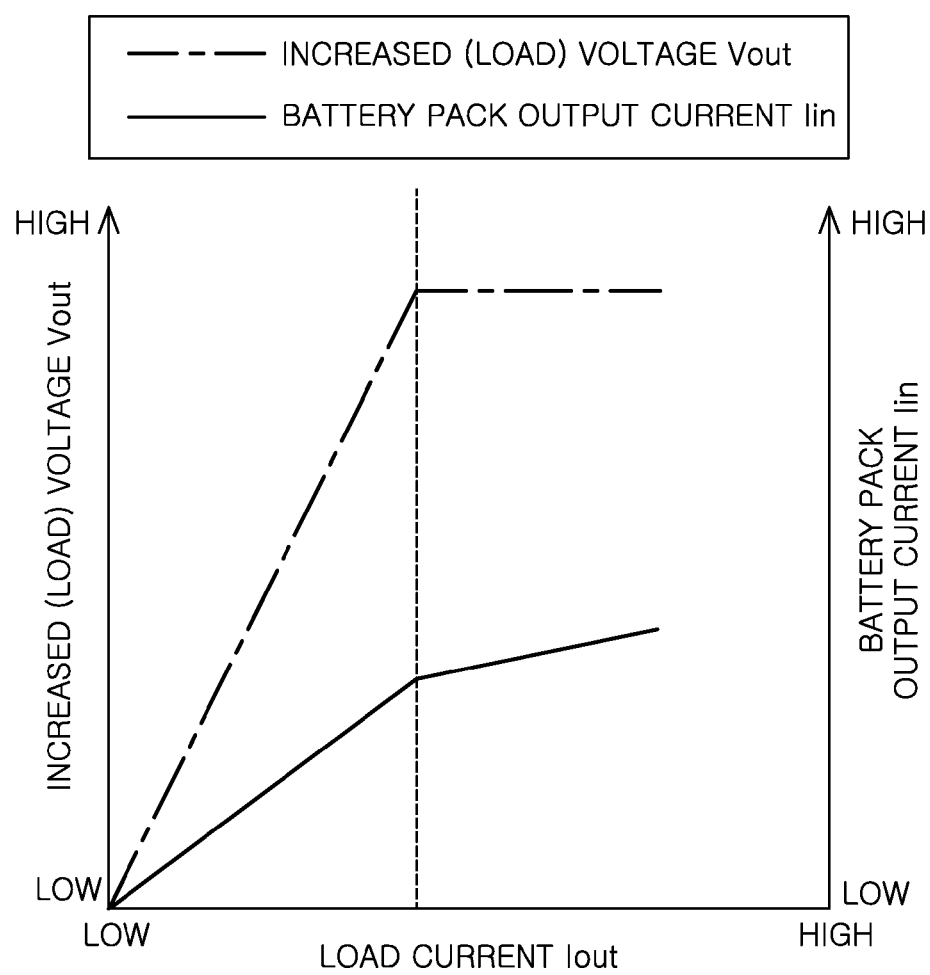
FIG. 7 is a graph for explaining an operation example of the electric power tool in accordance with the embodiment.

Next, an operation example of the electric power tool in accordance with the present embodiment will be described with reference to FIG. 7.

When the trigger switch 25 of the tool body 11 is pushed inward, the electric power begins to be supplied from the battery pack 12. The control circuit 55 performs a PWM-control of the switching element 54 in the converter circuit 51, thereby causing the converter circuit 51 to start a convert control (e.g., an increase of voltage or current). At this time, the control circuit 55 monitors, through the characteristic detection circuit 56, the increased voltage (the load voltage) Vout, the current (the load current) Iout outputted to the load and the current Iin outputted from the battery pack 12. When the load voltage Vout reaches a value suitable for use in the tool body 11 (the rated voltage in case of the present embodiment), the control circuit 55 controls at least one of the current and the voltage so that the load voltage Vout does not exceed the rated voltage of the tool body 11. For example, the current Iin outputted from the battery pack 12 is reduced (that is, an increase rate of the current Iin with respect to the load current Iout becomes lowered as shown in FIG. 7), so that it is possible to suppress the occurrence of over-current with respect to the battery pack 12.

Next, description will be made on the effects provided by the present embodiment.

(1) The control circuit 55 of the adapter 13 controls the converter circuit 51 to increase each of at least one of the voltage and the current outputted from the battery pack to a corresponding reference value and also performs a control operation of suppressing the increase of at least one of the voltage and the current in the converter circuit to prevent the occurrence of over-current or over-discharge based on at least one detection result detected by the characteristic detection circuit 56. In this regard, the electric power is continuously supplied to the motor 23 while the increase of at least one of the voltage and the current is suppressed. It is therefore possible to suppress the occurrence of over-current or over-discharge while maintaining workability.

(2) The control circuit 55 performs the control operation of suppressing the increase of at least one of the voltage and the current within a range equal to or smaller than the reference value (e.g., the rated voltage) to prevent the occurrence of over-current or over-discharge based on at least one detection result detected by the characteristic detection circuit 56. Accordingly, it becomes possible to reliably suppress the occurrence of over-current or over-discharge.

(3) The characteristic detection circuit 56 detects the voltage inputted to the motor 23. The control circuit 55 performs the control operation of suppressing the increase of at least one of the voltage and the current in the converter circuit 51 to prevent the occurrence of over-current or over-discharge based on the voltage value detected by the characteristic detection circuit 56. Since such control operation is performed while the electric power is continuously supplied to the motor 23, it is possible to suppress the occurrence of over-current or over-discharge while maintaining workability.

Various modification can be made to the embodiment of the present invention as described below.

Figure 8:
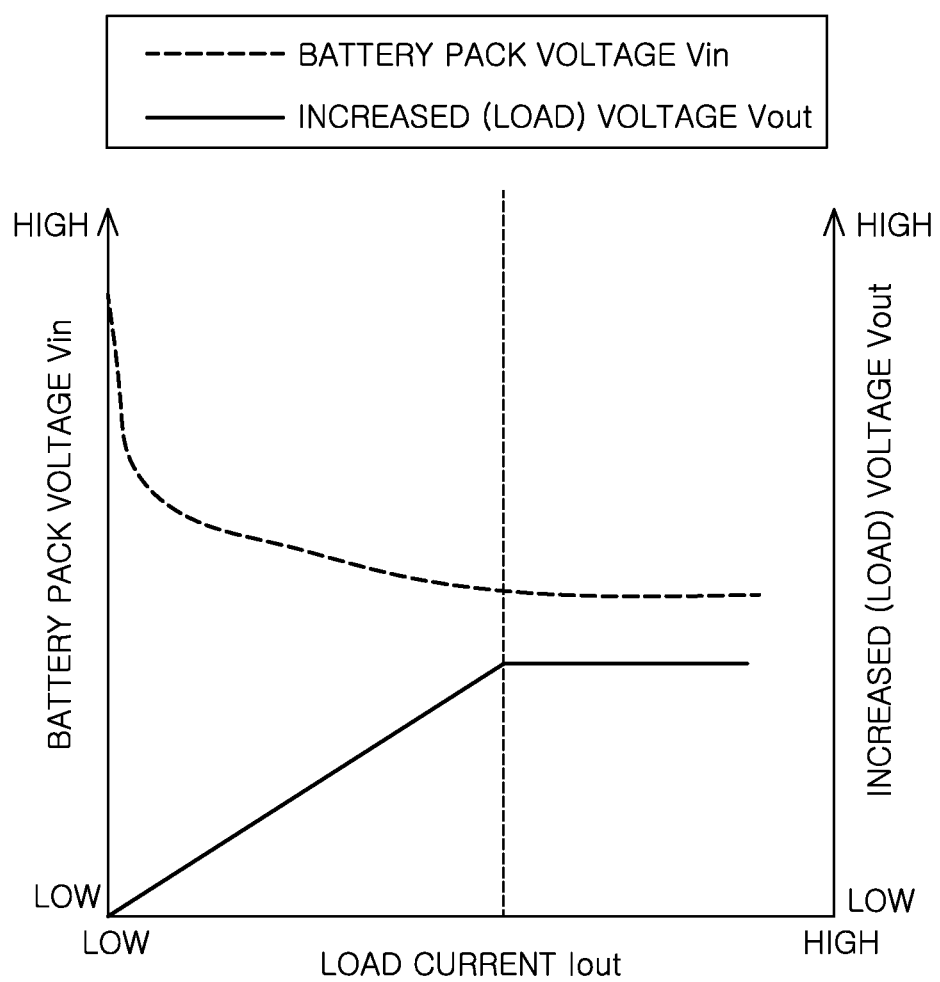
FIGS. 8 to 15 are graphs for explaining other operation examples of the electric power tool, respectively.

For example, as shown in FIG. 8, the control circuit 55 monitors the voltage Vin outputted from the battery pack through the characteristic detection circuit 56, and suppresses the increase of, e.g., the load voltage Vout, by controlling at least one of the current and the voltage such that the voltage Vin of the battery pack 12 does not become equal to or smaller than a reference value. Accordingly, it is possible to suppress the occurrence of the over-discharge with respect to the battery pack 12.

Figure 9:
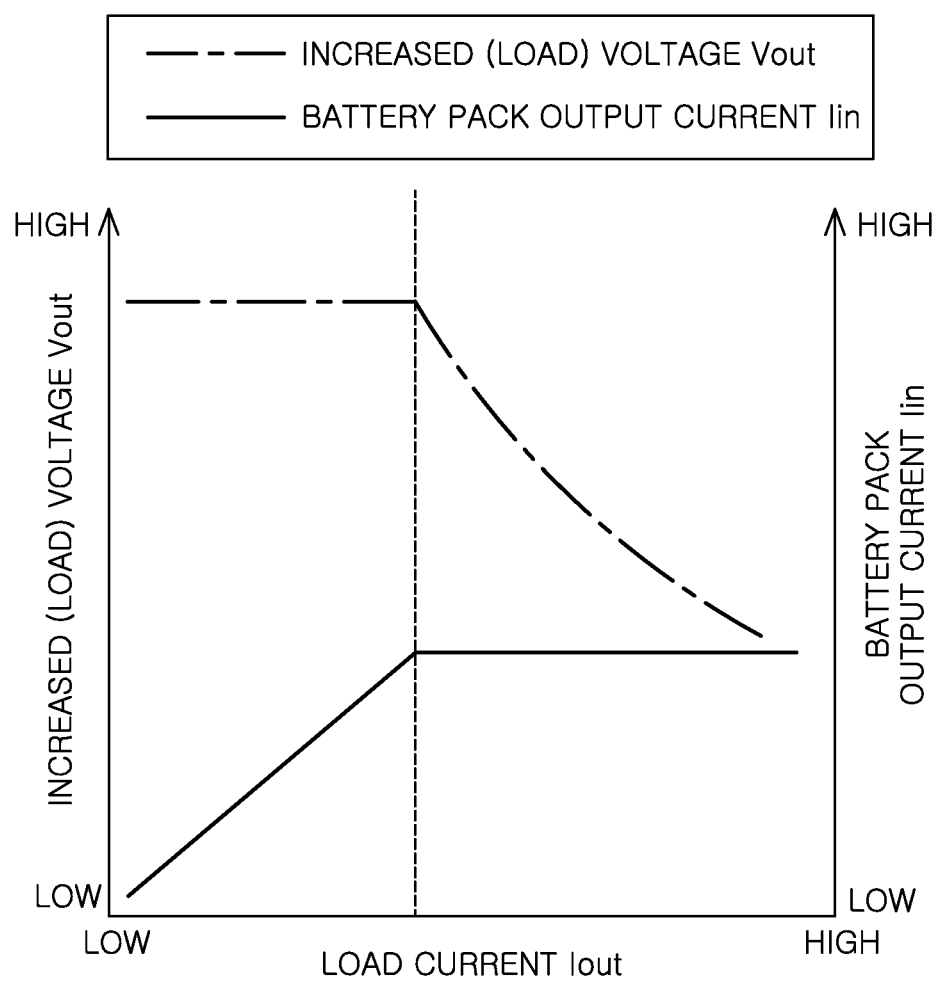

For example, as shown in FIG. 9, the control circuit 55 monitors the current Iin outputted from the battery pack through the characteristic detection circuit 56, and reduces, e.g., the increased voltage, by performing a PWM control of the switching element 54 so that, upon reaching a reference value, the current Iin outputted from the battery pack 12 is restrained from increasing beyond the reference value. Accordingly, it is possible to suppress the occurrence of over-discharge or over-current with respect to the battery pack 12.

While not specifically described in the foregoing embodiment, it may be possible to employ a configuration in which the characteristic detection circuit 56 may include a temperature detection unit 63 configured to detect a battery pack temperature Tv or a temperature of at least one circuit component of the converter circuit 51 representing a temperature of the converter circuit (converter unit) 51 (e.g., at least one of a characteristic detection circuit temperature Ts, a control circuit temperature Tm, a coil temperature Ti, a diode temperature Td, a switching element temperature Tf and a capacitor temperature Tc).

Figure 10:
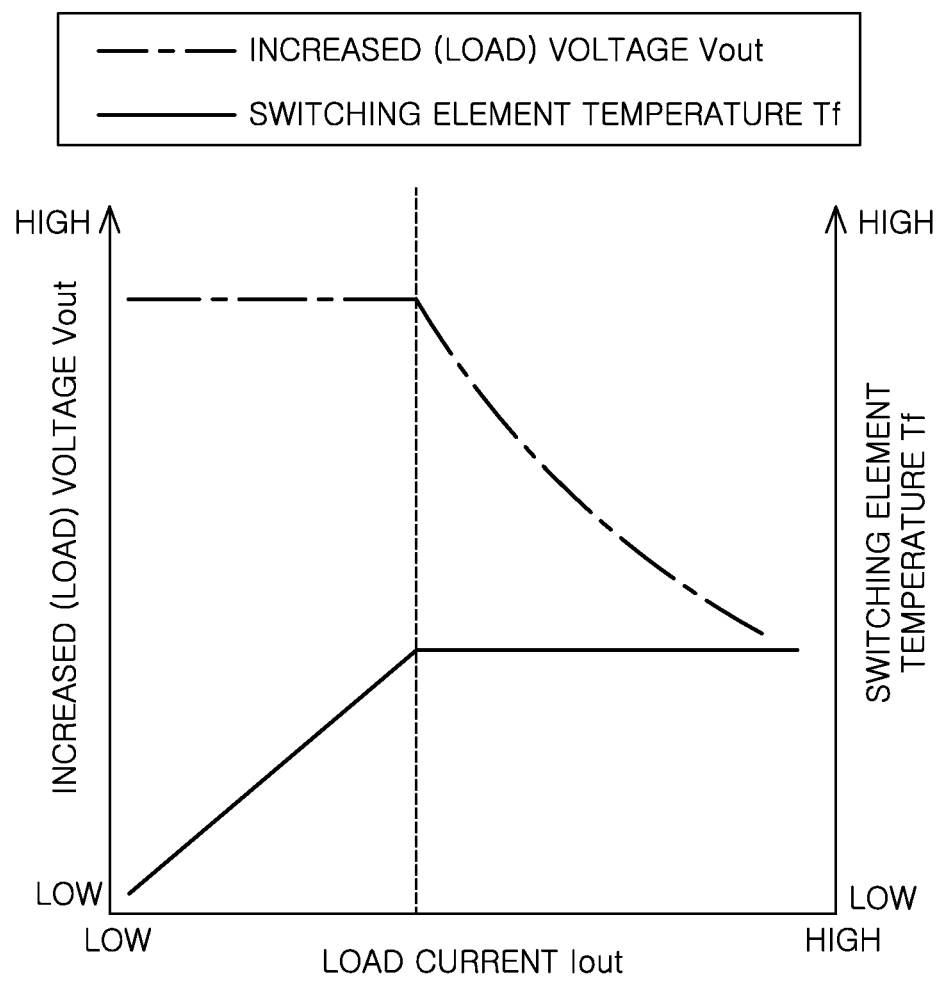

For example, as shown in FIG. 10, if it is assumed that the switching element temperature Tf is detected by the temperature detection unit 63 of the characteristic detection circuit 56, the control circuit 55 reduces, e.g., the increased voltage, by performing a PWM control of the switching element 54 so that, upon reaching a reference value, the switching element temperature Tf is restrained from increasing beyond the reference value. Accordingly, it is possible to suppress the occurrence of over-discharge or over-current with respect to the battery pack 12.

Figure 11:
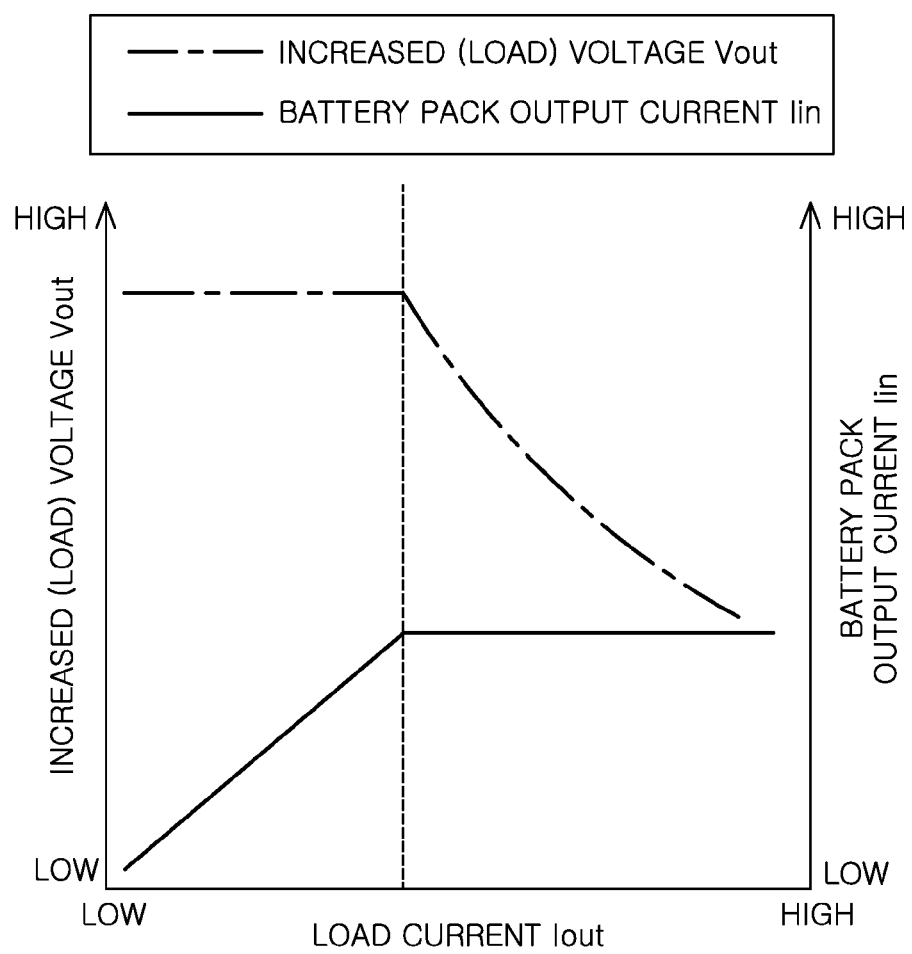

Further, for example, the characteristic detection circuit 56 may include at least two of the voltage detection unit 61, the current detection unit 62 and the temperature detection unit 63. Using two or more detection results detected by at least two of the voltage detection unit 61, the current detection unit 62 and the temperature detection unit 63, the control circuit 55 may perform a control operation of suppressing the increase of at least one of the voltage and the current. FIG. 11 illustrates an instance where the battery-pack output current Iin and the load voltage Vout are detected by the characteristic detection circuit 56. As illustrated in FIG. 11, the characteristic detection circuit 56 detects the battery-pack output current Iin and the load voltage Vout. Based on the detection results, the control circuit 55 suppresses the increase of at least one of the current and the voltage. Accordingly, it is possible to suppress the occurrence of over-discharge or over-current with respect to the battery pack 12.

Figure 13:
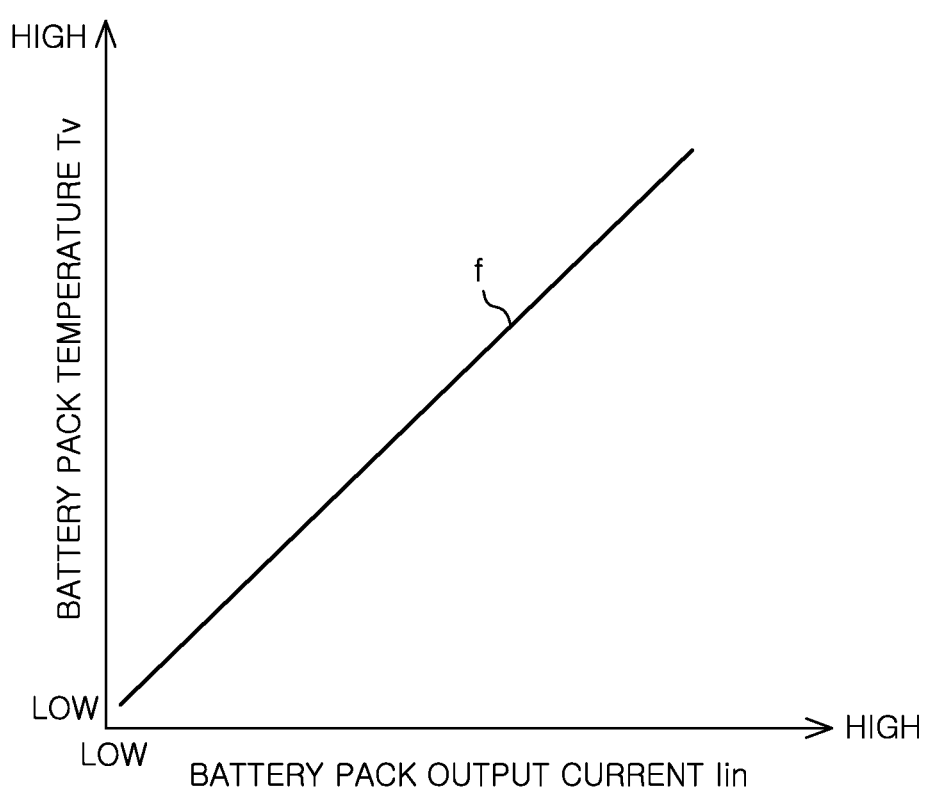

Further, for example, the characteristic detection circuit 56 may include a current detection unit 62 and a temperature detection unit 63. As shown in FIG. 2, the control circuit 55 includes a storage unit 55a which stores a temperature-current conversion table (a function f in FIG. 13) which is a correspondence table between battery pack temperatures Tv and currents Iin outputted from the battery pack 12. By referring to the temperature-current conversion table, the control circuit 55 finds a reference current value from the battery pack temperature Tv detected by the temperature detection unit 63. When the current Iin detected by the current detection unit 62 is higher than the reference current value, the control circuit 55 performs a control operation of suppressing the increase of at least one of the voltage and the current. While the function f has a direct proportional relationship in FIG. 13, the present invention is not necessarily limited thereto.

Figure 12:
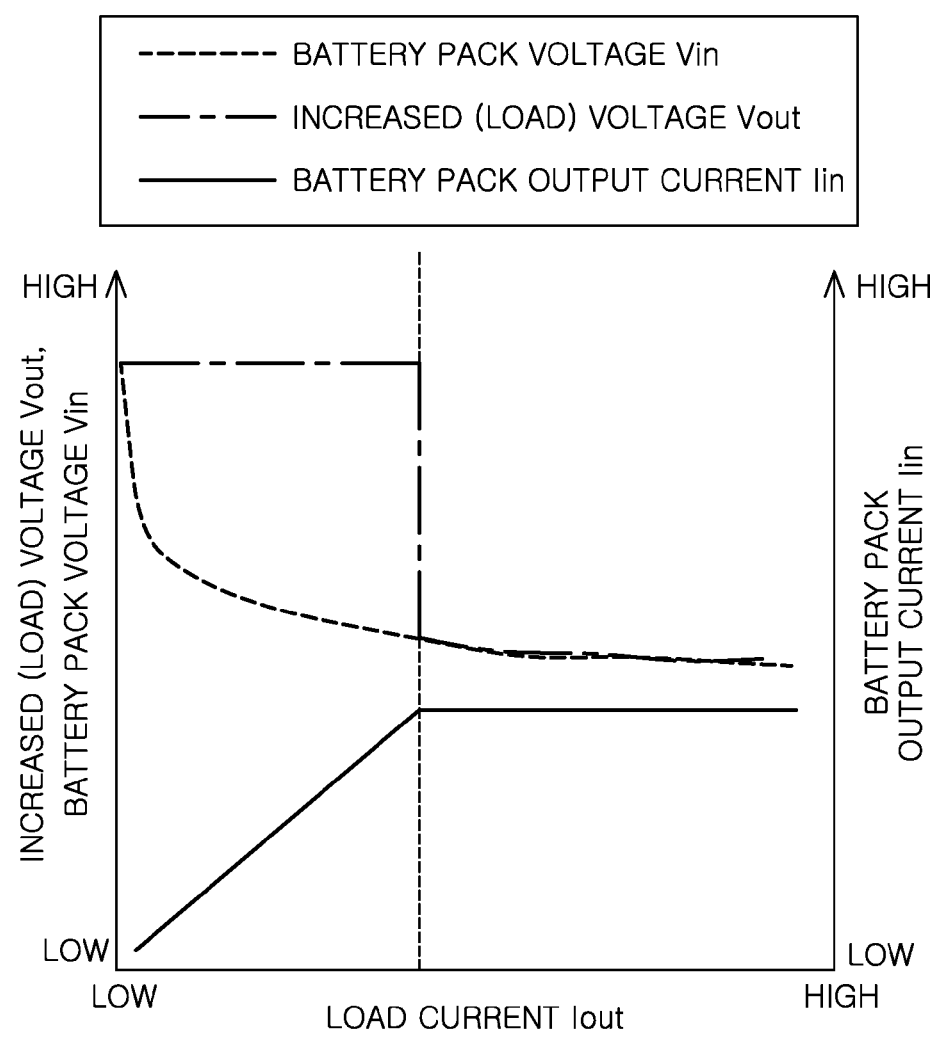

Further, for example, as shown in FIG. 12, when the current Iin or the current Iout detected by the current detection unit 62 reaches a reference current value and when the voltage Vin or the voltage Vout detected by the characteristic detection circuit 56 becomes equal to or lower than a reference voltage value, the control circuit 55 stops the converter circuit 51 and allows the voltage supplied from the battery pack 12 to be supplied to the motor 23. With this configuration, it is possible to restrain the converter circuit 51 from incurring over-discharge or over-current with respect to the battery pack 12.

Figure 14:
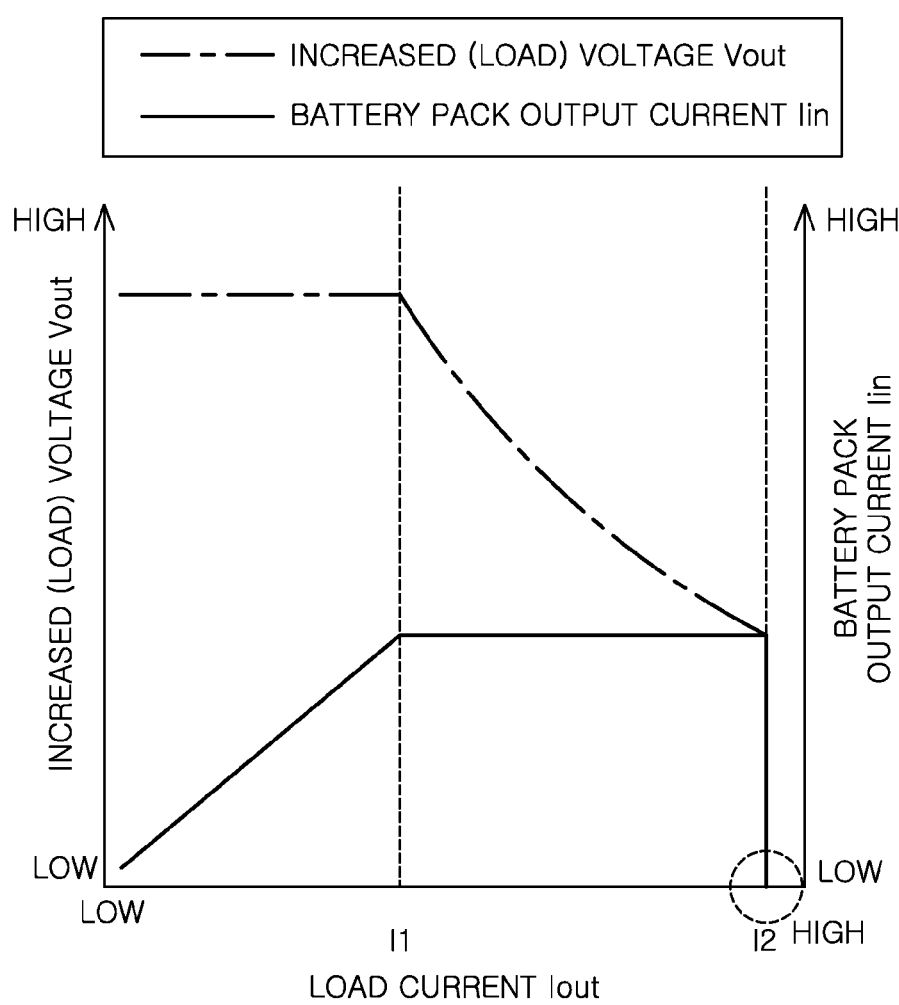

For example, as shown in FIG. 14, the control circuit 55 has a first over-current threshold I1 and a second over-current threshold I2 larger than the first over-current threshold I1. When the current Iin outputted from the battery pack 12 for example reaches the first over-current threshold I1, the control circuit 55 reduces the load voltage Vout by suppressing the increase of at least one of the voltage and the current in the converter circuit 51 to prevent the occurrence of over-current based on the detection result detected by the characteristic detection circuit 56. When the current Iin outputted from the battery pack 12 for example reaches the second over-current threshold I2, the control circuit 55 stops the operation of the motor 23. With this configuration, it is possible to prevent the battery pack 12 from being broken.

Figure 15:
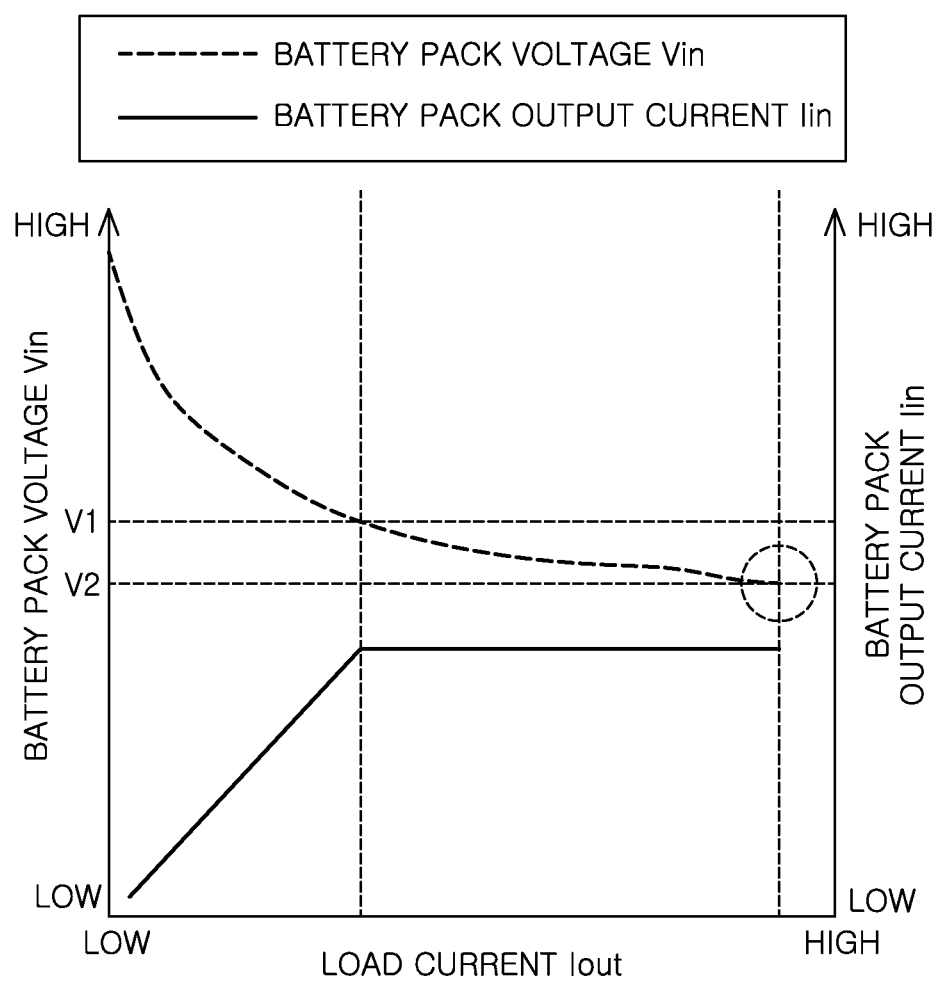

Further, for example, as shown in FIG. 15, the control circuit 55 has a first over-discharge threshold V1 and a second over-discharge threshold V2 smaller than the first over-discharge threshold V1. When the voltage Vin outputted from the battery pack 12 for example reaches the first over-discharge threshold V1, the control circuit 55 reduces the load voltage Vout by suppressing the increase of at least one of the voltage and the current in the converter circuit 51 to prevent the occurrence of over-discharge based on the detection result detected by the characteristic detection circuit 56. If the voltage Vin outputted from the battery pack 12 for example reaches the second over-discharge threshold V2, the control circuit 55 stops the operation of the motor 23. With this configuration, it is possible to prevent the battery pack 12 from being broken.

While the electric power tool 10 provided with the adapter 13 is described in the above embodiment, the present invention is not limited thereto. For example, a cleaner, a blower or an illumination device may be provided with the adapter 13.

While the invention has been shown and described with respect to the embodiments, it will be understood by those skilled in the art that various changes and modification may be made without departing from the scope of the invention as defined in the following claims.

What is claimed is:

1. An adapter, comprising:
a converter unit configured to increase at least one of a voltage and a current outputted from a battery pack and supply the increased at least one of the voltage and the current to a load;
a characteristic detection unit configured to detect at least one of the voltage outputted from the battery pack, the current outputted from the battery pack, and a temperature of the battery pack;
a control unit configured to control the converter unit to increase each of said at least one of the voltage and the current outputted from the battery pack to a corresponding reference value and further perform a control operation of suppressing the increase of said at least one of the voltage and the current in the converter unit to prevent an occurrence of over-current or over-discharge based on at least one detection result detected by the characteristic detection unit while continuously supplying the increased at least one of the voltage and the current to the load; and
a storage unit in which temperatures of the battery pack and reference currents corresponding to the temperatures of the battery pack are stored,
wherein the characteristic detection unit is configured to detect the temperature of the battery pack and the current outputted from the battery pack, and
wherein, by referring to a reference current corresponding to the detected temperature of the battery pack, the control unit compares the detected current with the reference current, and, when the detected current is higher than the reference current, performs the control operation of suppressing the increase of said at least one of the voltage and the current in the converter unit while continuously supplying the increased at least one of the voltage and the current to the load.

2. An electric power tool comprising:
the adapter described in claim 1;
the battery pack; and
a tool body having the load.

3. The electric power tool of claim 2, wherein the adapter is configured to be provided in the tool body.

4. The electric power tool of claim 2, wherein the adapter is configured to be provided between the tool body and the battery pack.

5. An adapter, comprising:
a converter unit configured to increase at least one of a voltage and a current outputted from a battery pack and supply the increased at least one of the voltage and the current to a load;
a characteristic detection unit configured to detect at least one of the voltage outputted from the battery pack, the current outputted from the battery pack, and a temperature of the battery pack; and
a control unit configured to control the converter unit to increase each of said at least one of the voltage and the current outputted from the battery pack to a corresponding reference value and further perform a control operation of suppressing the increase of said at least one of the voltage and the current in the converter unit to prevent an occurrence of over-current or over-discharge based on at least one detection result detected by the characteristic detection unit while continuously supplying the increased at least one of the voltage and the current to the load,
wherein the control unit has a first over-current threshold and a second over-current threshold larger than the first over-current threshold,
wherein, when a detection result reaches the first over-current threshold, the control unit performs the control operation of suppressing the increase of said at least one of the voltage and the current in the converter unit to prevent the occurrence of over-current while continuously supplying the increased at least one of the voltage and the current to the load, and
wherein, when the detection result reaches the second over-current threshold, the control unit stops the operation of the load.

6. An electric power tool comprising:
the adapter described in claim 5;
the battery pack; and
a tool body having the load.

7. The electric power tool of claim 6, wherein the adapter is configured to be provided in the tool body.

8. The electric power tool of claim 6, wherein the adapter is configured to be provided between the tool body and the battery pack.

9. An adapter, comprising:
a converter unit configured to increase at least one of a voltage and a current outputted from a battery pack and supply the increased at least one of the voltage and the current to a load;
a characteristic detection unit configured to detect a temperature of the battery pack and a current outputted from the battery pack;
a control unit configured to control the converter unit to increase each of said at least one of the voltage and the current outputted from the battery pack to a corresponding reference value and further perform a control operation of suppressing the increase of said at least one of the voltage and the current in the converter unit to prevent an occurrence of over-current or over-discharge based on at least one detection result detected by the characteristic detection unit; and
a storage unit in which temperatures of the battery pack and reference currents corresponding to the temperatures of the battery pack are stored,
wherein, by referring to a reference current corresponding to the detected temperature of the battery pack, the control unit compares the detected current with the reference current, and performs the control operation of suppressing the increase of said at least one of the voltage and the current in the converter unit when the detected current is higher than the reference current.

10. The adapter of claim 9, wherein the control unit performs the control operation of suppressing the increase of said at least one of the voltage and the current in the converter unit within a range equal to or smaller than the corresponding reference value to prevent the occurrence of over-current or over-discharge based on said at least one detection result.

11. The adapter of claim 9, wherein the control unit has a first over-current threshold and a second over-current threshold larger than the first over-current threshold, wherein, when a detection result reaches the first over-current threshold, the control unit performs the control operation of suppressing the increase of said at least one of the voltage and the current in the converter unit to prevent the occurrence of over-current, and wherein, when the detection result reaches the second over-current threshold, the control unit stops the operation of the load.

12. An electric power tool comprising:
the adapter described in claim 9;
the battery pack; and
a tool body having the load.

13. The electric power tool of claim 12, wherein the adapter is configured to be provided in the tool body.

14. The electric power tool of claim 12, wherein the adapter is configured to be provided between the tool body and the battery pack.

15. An adapter, comprising:
a converter unit configured to increase at least one of a voltage and a current outputted from a battery pack and supply the increased at least one of the voltage and the current to a load;
a characteristic detection unit configured to detect at least one of the voltage outputted from the battery pack, the current outputted from the battery pack, and a temperature of the battery pack; and
a control unit configured to control the converter unit to increase each of said at least one of the voltage and the current outputted from the battery pack to a corresponding reference value and further perform a control operation of suppressing the increase of said at least one of the voltage and the current in the converter unit to prevent an occurrence of over-current or over-discharge based on at least one detection result detected by the characteristic detection unit while continuously supplying the increased at least one of the voltage and the current to the load, wherein the control unit has a first over-discharge threshold and a second over-discharge threshold smaller than the first over-discharge threshold, wherein, when a detection result reaches the first over-discharge threshold, the control unit performs the control operation of suppressing the increase of said at least one of the voltage and the current in the converter unit to prevent the occurrence of over-discharge while continuously supplying the increased at least one of the voltage and the current to the load, and wherein, when the detection result reaches the second over-discharge threshold, the control unit stops the operation of the load.

16. An electric power tool comprising:
the adapter described in claim 15;
the battery pack; and
a tool body having the load.

17. The electric power tool of claim 16, wherein the adapter is configured to be provided in the tool body.

18. The electric power tool of claim 16, wherein the adapter is configured to be provided between the tool body and the battery pack.

\* \* \* \* \*